(12) United States Patent
Greaves et al.

(10) Patent No.: US 6,990,062 B2
(45) Date of Patent: Jan. 24, 2006

(54) REDUCED COMPLEXITY DMT/OFDM TRANSCEIVER

(75) Inventors: David Greaves, Cambridge (GB); Martin K. Jackson, Suffolk (GB)

(73) Assignee: Virata Limited, Cambridge (GB)

( * ) Notice: Subject to any disclaimer, the term of this patent is extended or adjusted under 35 U.S.C. 154(b) by 745 days.

(21) Appl. No.: 09/904,924

(22) Filed: Jul. 13, 2001

(65) Prior Publication Data

US 2002/0034159 A1    Mar. 21, 2002

(30) Foreign Application Priority Data

Jul. 14, 2000    (GB) .................................... 0017359

(51) Int. Cl.
*H04J 11/00* (2006.01)
(52) U.S. Cl. .................. 370/210; 370/208; 708/404
(58) Field of Classification Search ............... 370/207, 370/208, 394, 431, 210; 708/403, 404; 455/464; 375/222, 260
See application file for complete search history.

(56) References Cited

U.S. PATENT DOCUMENTS

| 5,790,514 | A |   | 8/1998 | Marchok et al. ............ 370/208 |
| 5,862,182 | A | * | 1/1999 | Awater et al. ............. 375/279 |
| 5,995,483 | A |   | 11/1999 | Marchok et al. ............ 370/207 |
| 6,169,723 | B1 | * | 1/2001 | Fertner et al. ............. 370/210 |

* cited by examiner

*Primary Examiner*—Duc Ho
(74) *Attorney, Agent, or Firm*—Morrison & Foerster LLP

(57) ABSTRACT

A DMT/OFDM transceiver wherein communication occurs between stations in the form of symbols distributed and transmitted in channels which are allocated when making a link between the stations, each channel supporting a number of bits depending on the spectral response of the link when established. Instead of providing separate modules for performing iFFT's and FFT's, the transceiver has only a single FFT, or iFFT which operates on real and imaginary parts of the data stream; the outputs of the FFT or iFFT being supplied to a post processing stage where simultaneous equations having real and imaginary terms for the transmit and receive data, are solved in order to separate the transmit and receive data.

6 Claims, 3 Drawing Sheets

REDUCED COMPLEXITY DMT/OFDM TRANSCEIVER

TECHNICAL FIELD OF THE INVENTION

This invention relates to Discrete MultiTone (DMT) and Orthogonal Frequency Division Multiplex (OFDM) systems and more particularly to a DMT/OFDM transceiver.

BACKGROUND OF THE INVENTION

In DMT/OFDM systems, bits in a transmit data stream are divided up into symbols which are then grouped and used to modulate a number of carriers. Each carrier is modulated using either Quadrature Amplitude Modulation (QAM), or Quadrature Phase Shift Keying (QPSK) and, dependent upon the characteristics of the carrier's channel, the number of source bits allocated to each carrier will vary from carrier to carrier. In the transmit mode, inverse Fast Fourier Transforms (iFFT's) are used to convert QAM modulated pairs into symbols for the transmitted signal. In the receive direction, Fast Fourier Transforms (FFT's) are used before QAM demodulation.

In typical systems, the discrete Fourier transform (DFT) or inverse discrete Fourier transform (iDFT) is performed using the Fast Fourier transform (FFT) operation. The FFT has the advantage that the number of operations compared to the DFT is significantly reduced. A "N" point DFT requires N^2 operations whilst an "N" point FFT requires N $\log_2$ (N)/2 operations, a considerable saving.

As has already been noted the transmitter requires an inverse FFT while the receiver requires an FFT. In DMT systems, such as ADSL, these operations are typically performed by separate hardware or software modules or a single, double speed module used alternately for receive and transmit. An object of the present invention is how to make this less complex by using a single normal speed module, in hardware or software, to implement both functions, since this will result in a considerable reduction in computational complexity, besides less expense for silicon.

It is known from an article "ADSL, VDSL and Multicarrier Modulation" by John A. C. Bingham (John Wiley & Sons), that if the data for a FFT is only real valued, by packing odd and even samples into a complex array of half the original length, the FFT size may be reduced to half. The resultant, complex data output is separated by:

(1) Pre-processing the data such that when an iFFT is performed the real par contains even time samples and the imaginary part odd time samples:

$Y[i]=\{X(i)+X^*(N-i)]+j[X(i)-X^*(N-i)W^*(N-i)\}^*$ (where N is the size of the transform, e.g. a 256 point complex vector and X* is the complex conjugate).

(2) Providing an input to the FFT which is a 256 point complex vector formed from the real 2N point data: the real part containing even sample points and the imaginary part odd sample points and post processing the FFT output:

$Y[i]=0.5[X(i)+X^*(N-i)]-j/2[X(i)-X^*(N-i)]W^{\wedge}1$ (where W is the butterfly factor)

There are several variations on this technique including maintaining the original FFT size and then packing two real arrays into a single complex array; a simple post processing operation being used to separate the data. The technique is described in "Handbook of Real Time FFTs" by Winthrop Smith and Joanne Smith (IEEE press), the basic steps are:

Let:
a(n) and b(n) be real vectors of length N, let:

$c(n)=a(n)+jb(n)$ (where $j$ is the square root of −1).

Let:

$C(k)=FFT[c(n)]=R(k)+jI(k)$ where $k=0, 1, 2, \ldots (N-1)$

The complex transforms, A(k) and B(k), of the original vectors are now separated using, for example:

```
for (k = 1; k++,k <=(N-2)/2) {
RP(k) = RP(N-k) = (R(k) + R(N-k))/2
RM(k) = -RM(N-k) = (R(k) - R(N-k))/2
IP(k) = IP(N-k) = (I(k) + I(N-k)))/2
IM(k) = -IM(N-k) = (I(k) - I(N-k)))/2
}
RP(0) = R(0)
IP(0) = I(0)
RM(0) = IM(0) = RM(N/2) = IM(N/2) = 0
RP(N/2) = R(N/2)
IP(N/2) = I(N/2)
```
(where P and M are respectively..........please identify...)

Finally (and for example):

```
for (k = 0; k++, k <=(N-1)) {
A(k) = RP(k) + jIM(k)
B(k) = IP(k) - jRM(k)
}
```

Transforming two real arrays at the same time is potentially more efficient but overall the technique has the disadvantage that the overall latency for data is doubled. Some services, such as digitised voice, have strict latency requirements and this additional delay may be unacceptable.

SUMMARY OF THE INVENTION

The present invention seeks to avoid the latter disadvantage by exploiting a new technique which can be used to simplify the construction of a transceiver in an ADSL DMT system, but without compromising reliability.

Broadly speaking, the invention can be applied to a discrete multitone (DMT) and orthogonal frequency division multiplex (OFDM) transceiver wherein communication occurs between stations in the form of symbols. The symbols are distributed and transmitted in channels which are allocated when making a link between the stations, each channel supporting a number of bits depending on the spectral response of the link when it is established. Such a system has a transmit mode where, according to the channel allocations, variable length sequences of bits are encoded. With QAM, for example, these would be amplitude quadrature pairs. Inverse fast Fourier transforms (iFFT's) are normally performed (e.g. on the QAM pairs) before the symbols are transmitted. In a receive mode, the received symbols are sampled and fast Fourier transforms (FFT's) are normally performed on the samples to produce data sequences (e.g. QAM pairs) which are decoded into variable length sequences for each channel. However, instead of providing separate modules for performing iFFT's and FFT's, a transceiver incorporating the invention has only a single FFT, or iFFT which operates on real and imaginary parts of the data stream; the outputs of the FFT or iFFT being supplied to a post processing stage where simultaneous equations having real and imaginary terms for the transmit and receive data, are solved in order to separate the transmit and receive data.

For example, FFT's can be performed on the complex conjugate QAM pairs to produce the effect of iFFT's on the transmission data, whilst FFT's can also be performed on received QAM pairs, the real and imaginary parts being separated later by post processing. More particularly, where pairs of sample values output from a single FFT are of the form y[x]=P+jQ and y[N−x]=R+jS, a simple stage of post processing can be used to separate the transmit and receive data on the basis of solving:

$A=(Q+S)/2$ $B=(Q-S)/2$

Where, rx data$[x]=A+jB$ tx data $[x]=P-S$ and tx data $[N-x]=R-Q$

An embodiment of the invention will now be described, by way of example, with reference to the accompanying schematic drawings, in which:

DETAILED DESCRIPTION OF THE PREFERRED EMBODIMENTS

Figure 1:
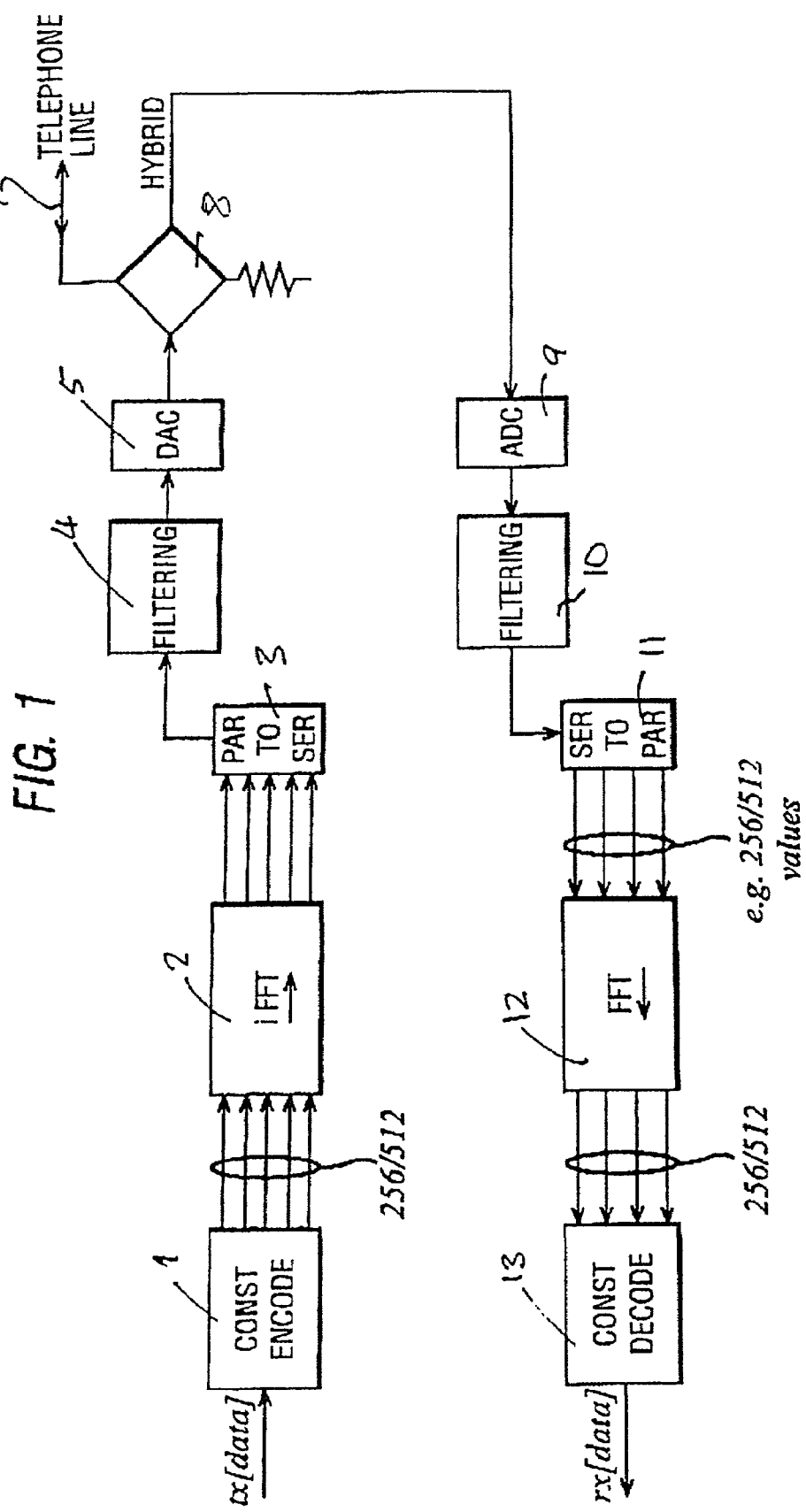
FIG. 1 is a simplified diagram of a conventional xDSL modem.

Referring to FIG. 1, this illustrates, in a much simplified form, a conventional xDSL modem where separate iFFt's are performed on transmission data and FFT's are performed on reception data.

An input transmitted sample stream tx data is processed to produce symbols for transmission on the telephone line 7. For example, variable-length sequences of bits (according to a table of channel bit allocations) are passed to QAM complex encoder 1 which then produces one amplitude pair per sequence of bits. The amplitude pairs are then processed by iFFT 2, and parallel to serial converter 3 which creates a sample stream at some multiple of the symbol rate. This is then upsampled in filtering stage 4 and passed to DAC 5 to produce symbols for transmission. Hybrid circuit 8 allows either transmission, or reception of symbols on line 7.

When symbols are received from the line 7, these are processed in order to reproduce a received data stream rx, For example, a sequence of received symbols is sampled by the ADC 9 at a substantially fixed sampling rate to produce a stream of samples, which are then downsampled and passed through an equaliser (represented by filtering stage 10) and serial to parallel converter 11 before being processed by an FFT 12 (e.g. using n frequency bins, such that each carrier tone in the signal maps to a distinct frequency bin in the FFT). The output of the FFT 12 comprises a sequence of n pairs of amplitude in-phase and quadrature components (in each frequency bin), which are then processed (e.g. by a frequency domain equaliser, not shown) to correct for phase shifts before the amplitude pairs are fed into complex decoder 13 (which, using a table of carrier channel bit allocations, converts the amplitude pairs into variable-length sequences of bits using known QAM decoding techniques). Typically, the bits are then combined to produce an output stream of fixed-length data words.

The processing stages are usually implemented in hardware with a software controller overseeing the various stages. Hybrid stage 8 operates so as to transmit symbols or to receive symbols. All of the stages other than the ADC and DAC may alternatively be implemented solely or substantially in software, subject to the availability of sufficient processing power, or wholly or substantially in hardware.

In the system shown, 256 samples of data are processed by the iFFT, and 256 samples by FFT's. The number 256/512 indicates the number of values in use in a G.992.1 and G.992.2 system respectively. This can be the same in the preferred embodiment of the invention, or it can employ different sizes of FFT.

The diagram has been simplified to facilitate understanding, since the system would normally includes far more complex circuitry, for example, cyclic prefix and asymmetry between tx and rx data sizes are not discussed here, because they are well known and do not form part of the invention. Moreover, the operation of such an xDSL modem is well known in the art, ie. where separate FFT and iFFT is used respectively for steams of data to be transmitted and data which is received.

Figure 2:
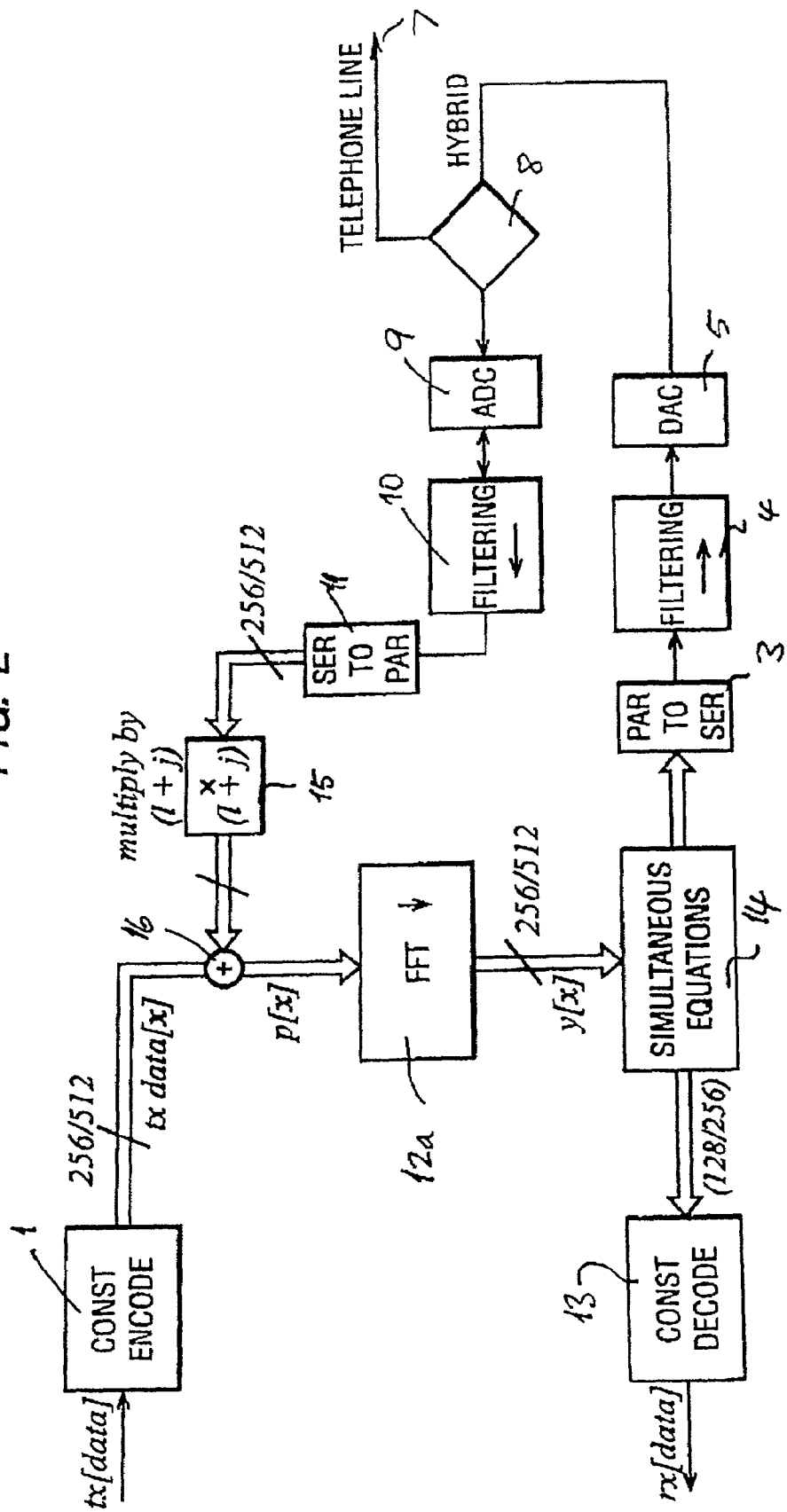
FIG. 2 shows an embodiment of the invention.

Referring now to FIG. 2, where similar elements have been identified by similar reference numerals, an xDSL modem has only FFT 12a, because this performs FFT's on complex tx data, and FFT's on rx data. In order to enable the use of one FFT, the tx data is supplied to the complex encoder 1, whereby complex conjugate tx[constx]* samples (256/512) are processed by the FFT 12a and then separated from rx data in a post processing stage 14, which solves simultaneous equations as explained below The output from stage 14 passes to a parallel to serial converter 3 and then through filters 4 and DAC 5, before being supplied (as symbols) to the line 7 via hybrid circuitry 8. The conjugate operation can be built into the transmit constellation generator before using the FFT, since it is not needed on the receive side, because FFT is correct for the received data.

Symbols received from the line 7 likewise pass through the hybrid circuitry 8 to ADC 9 whereby the data stream is filtered 10 and then supplied to serial to parallel converter 11. Output values are multiplied by (1+j) in multiplier 15 and then supplied by adder 16 to FFT 11a. This enables rx samples to be separated later from the tx samples in the post processing stage 15, where simultaneous equations are solved to derive parameters for separating rx data samples (128/256) that are then decoded in the complex decoder 13. The separation of the data from the single FFT produces N/2 complex values for the receive constellation and N real values as the transmit data. Moreover, in a real application, there is freedom over scheduling of the FFT operations by inserting queues of samples in series with the transmit and receive filters. These queues keep the flow of samples at the DAC and ADC steady, but relax FFT timing.

The operation of this post processing stage will be more apparent from the following analysis:

Assuming that txconst[x] is the complex transmit data from the QAM or similar modulator and RX[x] is the real received data, we can form:

txdata$[x]=$txconst$^*[x]$ where * is the complex conjugate. This operation is required because we actually need the transmit data to be operated on by an iFFT and this is done by operating an FFT on the complex conjugate of the original data.

We also form:

$$p[x]=tx\text{data}[x]+RX[x]+jRX[x]$$

and by taking the FFT:

$$y[x]=FFT(p[x])=FFT(tx\text{data}[x]+RX[x]+jRX[x])=FFT(tx\text{data}[x])+FFT(RX[x])+jFFT[x]$$

If:

$$tx[x]=FFT(tx\text{data}[x])$$

$$rx\text{const}[x]=FFT(RX[x])=A+jB$$

therefore:

$$y[x]=tx[x]+rx\text{const}[x]+jrx\text{const}[x]$$

Considering the values of y[x] at the locations (x) and (N−x) where N is the size of the Fourier transform, then:

$$y[x]=P+jQ=tx[x]+A+jB+jA-B$$

$$y[N-x]=R+jS=tx[N-x]+A-jB+jA+B$$

because the receive data was real valued only.
So, $$P=tx[x]+A-B$$

$$Q=A+B$$

$$R=tx[N-x]+A+B$$

$$S=A-B$$

Solving for the variables on the right hand side we have:

$$tx[x]=P-S$$

$$tx[N-x]=R-Q$$

Also, $$A=(Q+S)/2$$

$$B=(Q-S)/2$$

Whereby, $$rx\text{const}[x]=A+jB$$

Figure 3:
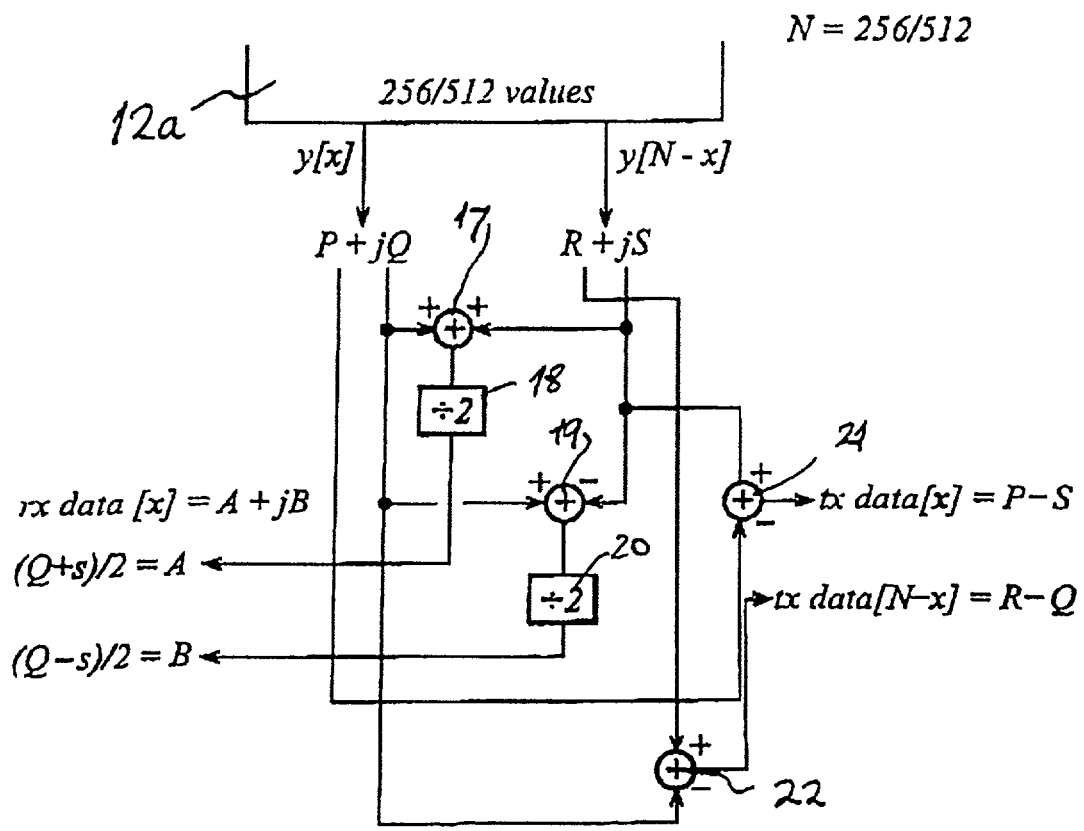
FIG. 3 shows a detail of part of the embodiment illustrated by FIG. 2.

Thus a single post processing stage can be constructed as shown in FIG. 3 to separate the transmit and receive data. In this processing stage, the output from the FFT is shown as y[x]=P+jQ and y[N−x]=R+jS. Imaginary parts jQ and jS are added in adder 17 and the result is divided by 2 in divider 18 to yield (Q+S)/2=A. Similarly, the imaginary parts jQ and jS are subtracted (by adding jQ to −jS in adder 19) and the result is divided by 2 in divider 20 to yield (Q−S)/2=B. The complex receive data rxconst(x) can then be derived from A+jB. By analogy, it can be seen that adders 21 and 22 are used to provide txdata[x]=P−S and txdata[N−x]=R−Q, from which transmission data can be derived. The set of operations is clearly symmetric and we could, to minimise the post processing, choose to use an iFFT instead of an FFT.

In many ADSL implementations the transmit iFFT and receive FFT are of different lengths and further post processing is required to perform the sample rate conversion so that the ADC and DAC have the same sample rate. A further advantage of this technique is that it eliminates this sample rate conversion step. Where the inverse process is used, i.e. where the circuitry shown in FIG. 2 includes an iFFT stage (not shown) rather than the FFT stage, the construction and operation will be clear to those skilled in the art.

Overall, the technique eliminates either the FFT or iFFT, substitutes a simple single pass post processing operation, and eliminates the sample rate conversion process. All of which result in a considerable reduction in computational complexity.

what is claimed is:

1. A discrete multitone (DMT) and orthogonal frequency division multiplex (OFDM) transceiver wherein communication occurs between stations in the form of symbols; the symbols being distributed and transmitted in channels which are allocated when making a link between the stations, each channel supporting a number of bits depending on the spectral response of the link when it is established; said transceiver having a transmit mode where, according to the channel allocations, variable length sequences of bits are encoded and inverse fast Fourier transforms (iFFT's) are normally performed, and a receive mode, in which the received symbols are sampled and fast Fourier transforms (FFT's) are normally performed on the samples to produce a data sequence, said sequence being decoded into variable length sequences;

characterised in that only a single FFT, or iFFT operates on real and imaginary parts of the data stream; the outputs of the FFT or iFFT being supplied to a post processing stage for solving simultaneous equations having real and imaginary terms, in order to derive parameters for separating the transmit and receive data.

2. A transceiver according to claim 1, wherein the FFT's are performed on the complex conjugate QAM pairs, and the FFT's are also performed on received QAM pairs.

3. A transceiver according to claim 2, wherein the output from the FFT's are of the form y[x]=P+jQ and y[N−x]=R+jS, and including a stage of post processing which separates the transmit data, tx data[x], from the receive data, rxdata[x], on the basis of solving:

$$A=(Q+S)/2$$

$$B=(Q-S)/2$$

Where, $$rx\,\text{data}[x]=A+jB$$

$$tx\,\text{data}[x]=P-S \text{ and } tx\text{data}[N-x]=R-Q.$$

4. A method of discrete multitone (DMT) and orthogonal frequency division multiplex (OFDM) communication between stations, wherein symbols are distributed and transmitted in channels which are allocated when making a link between the stations, each channel supporting a number of bits depending on the spectral response of the link when it is established; the method having a transmit mode where, according to the channel allocations, variable length sequences of bits are encoded and inverse fast Fourier transforms (iFFT's) are normally performed, and a receive mode, in which the received symbols are sampled and fast Fourier transforms (FFT's) are normally performed on the samples to produce a data sequence, said sequence being decoded into variable length sequences; characterised by performing only a single FFT, or iFFT on real and imaginary parts of the data stream; and supplying the outputs of the FFT or iFFT to a post processing stage for solving simultaneous equations having real and imaginary terms, in order to derive parameters for separating the transmit and receive data.

5. A method according to claim 4, wherein the FFT's are performed on the complex conjugate QAM pairs, and the FFT's are also performed on received QAM pairs.

6. A method according to claim 5, wherein the output from the FFT's are of the form y[x]=P+jQ and y[N−x]=R+jS, wherein the post processing separates the transmit data, tx data[x], from the receive data, rxdata[x], on the basis of solving:

$$A=(Q+S)/2$$

$$B=(Q-S)/2$$

Where, $$rx\ data[x]=A+jB$$

$$tx\ data[x]=P-S \text{ and } tx\text{data}[N-x]=R-Q$$

* * * * *